US00RE42698E

(19) United States
(12) Reissued Patent
Kuo et al.

(10) Patent Number: US RE42,698 E
(45) Date of Reissued Patent: Sep. 13, 2011

(54) TREADMILL HAVING DUAL TREADS FOR STEPPING EXERCISES

(75) Inventors: Hai Pin Kuo, Tainan (TW); Gary D. Piaget, Harbor, WA (US)

(73) Assignee: Nautilus, Inc., Vancouver, WA (US)

(21) Appl. No.: 10/962,256

(22) Filed: Oct. 8, 2004

Related U.S. Patent Documents

Reissue of:
(64) Patent No.: 6,461,279
Issued: Oct. 8, 2002
Appl. No.: 09/912,664
Filed: Jul. 25, 2001

(51) Int. Cl.
*A63B 22/02* (2006.01)

(52) U.S. Cl. ..... 482/54; 482/52

(58) Field of Classification Search ..... 482/51–54, 482/71, 72, 74, 111, 112, 70, 79, 80; 104/25; 198/324, 817; 292/246, 247
See application file for complete search history.

(56) References Cited

U.S. PATENT DOCUMENTS

| | | | | | |
|---|---|---|---|---|---|
| 219,439 | A | | 9/1879 | Blend | |
| 321,388 | A | | 6/1885 | Ruebsam | |
| 347,101 | A | * | 8/1886 | Ferry | 292/247 |
| 625,905 | A | | 5/1899 | Souder | |
| 663,486 | A | | 12/1900 | Boren | |
| 683,124 | A | | 9/1901 | Lange | |
| 782,010 | A | | 2/1905 | Dodge | |
| 783,769 | A | | 2/1905 | Wright | |
| 834,461 | A | * | 10/1906 | Fair | 292/247 |
| 881,521 | A | | 3/1908 | Wilson | |
| 931,394 | A | | 8/1909 | Day | |
| 956,681 | A | | 5/1910 | Clarke | |
| 1,015,071 | A | | 1/1912 | Reach | |
| 1,020,777 | A | | 3/1912 | Peterson | |
| 1,166,304 | A | | 12/1915 | Albert | |
| 1,239,077 | A | | 9/1917 | Begg | |
| 1,587,749 | A | | 6/1926 | Bierly | |
| 1,652,102 | A | * | 12/1927 | Elmer et al. | 403/95 |
| 1,715,870 | A | | 6/1929 | Spain | |
| 1,824,406 | A | | 9/1931 | Petersime | |
| 1,850,530 | A | | 3/1932 | Brown | |
| 1,870,244 | A | | 8/1932 | Elston | |

(Continued)

FOREIGN PATENT DOCUMENTS

| | | |
|---|---|---|
| AU | 233194 | 8/1959 |

(Continued)

OTHER PUBLICATIONS

"A Brief Look At Airpot", Catalog, Airpot Corp., pp. 1-15 (1982).

(Continued)

*Primary Examiner* — Loan Thanh
*Assistant Examiner* — Tam Nguyen
(74) *Attorney, Agent, or Firm* — Dorsey & Whitney LLP

(57) ABSTRACT

A treadmill device includes two treadmills disposed above a base and each having a tread supported around a platform and each has one end rotatably supported on the base with a shaft which may be driven by a motor. An arm has a middle portion pivotally supported on the base and has two ends located below and coupled to the treadmills, for elevating one of the treadmills when the other treadmill is lowered, such that the two treadmills may be operated as a stepping exerciser. A latch may be used to lock the treadmills together.

34 Claims, 14 Drawing Sheets

U.S. PATENT DOCUMENTS

| | | | | |
|---|---|---|---|---|
| 1,902,694 | A | | 3/1933 | Edwards |
| 1,928,089 | A | | 9/1933 | Blickman |
| 1,969,901 | A | | 8/1934 | Pilates |
| 1,973,945 | A | | 9/1934 | Chavin et al. |
| 2,209,034 | A | | 7/1940 | Paul |
| 2,239,076 | A | | 4/1941 | Biedess |
| 2,239,687 | A | | 4/1941 | Parker |
| 2,374,730 | A | | 5/1945 | Catlin |
| 2,380,221 | A | | 7/1945 | Cundall |
| 2,399,915 | A | | 5/1946 | Drake |
| 2,425,860 | A | | 8/1947 | Brady |
| 2,434,760 | A | | 1/1948 | Eggleston |
| 2,603,486 | A | | 7/1952 | Hughes |
| 2,661,973 | A | * | 12/1953 | Sweger ..... 292/246 |
| 2,855,200 | A | | 10/1958 | Blickman |
| 2,866,538 | A | | 12/1958 | Goldberg |
| 2,941,834 | A | * | 6/1960 | Appleton et al. ..... 292/341.19 |
| 2,969,060 | A | | 1/1961 | Swanda et al. |
| 3,022,433 | A | | 2/1962 | Ferranti |
| 3,127,171 | A | | 3/1964 | Noland et al. |
| 3,295,847 | A | | 1/1967 | Matt, Sr. |
| 3,312,466 | A | | 4/1967 | Melchiona |
| D207,541 | S | | 5/1967 | Hesen |
| 3,316,898 | A | | 5/1967 | Brown |
| 3,316,899 | A | | 5/1967 | Raeder |
| 3,319,767 | A | | 5/1967 | Breternitz et al. |
| 3,348,678 | A | | 10/1967 | Flowers |
| 3,378,259 | A | | 4/1968 | Kupchinski |
| D211,801 | S | | 7/1968 | Quinton |
| 3,427,019 | A | | 2/1969 | Brown |
| 3,444,830 | A | | 5/1969 | Doetsch |
| 3,473,843 | A | | 10/1969 | Hart |
| 3,497,215 | A | | 2/1970 | Harrison et al. |
| 3,501,040 | A | | 3/1970 | Martelee |
| 3,501,140 | A | | 3/1970 | Eichorn |
| 3,511,500 | A | | 5/1970 | Dunn |
| 3,525,522 | A | | 8/1970 | Piller |
| 3,529,474 | A | | 9/1970 | Olson et al. |
| 3,559,986 | A | | 2/1971 | Ehrmantraut |
| 3,586,322 | A | | 6/1971 | Kverneland |
| 3,589,715 | A | | 6/1971 | Mark |
| 3,590,980 | A | | 7/1971 | Bengtsson |
| 3,592,466 | A | | 7/1971 | Parsons |
| 3,602,502 | A | | 8/1971 | Hampl |
| 3,614,097 | A | | 10/1971 | Blickman |
| 3,627,313 | A | | 12/1971 | Schonfeld |
| 3,628,654 | A | | 12/1971 | Haracz |
| 3,638,941 | A | | 2/1972 | Kulkens |
| 3,642,279 | A | | 2/1972 | Cutter |
| 3,643,943 | A | | 2/1972 | Erwin, Jr. et al. |
| 3,647,209 | A | | 3/1972 | La Lanne |
| 3,659,845 | A | | 5/1972 | Quinton |
| 3,689,066 | A | | 9/1972 | Hagen |
| 3,703,284 | A | | 11/1972 | Hesen |
| 3,709,487 | A | | 1/1973 | Walker |
| 3,711,812 | A | | 1/1973 | Cherry |
| 3,731,917 | A | | 5/1973 | Townsend |
| 3,741,538 | A | | 6/1973 | Lewis et al. |
| 3,741,540 | A | | 6/1973 | Shimizu |
| 3,747,924 | A | | 7/1973 | Champoux |
| 3,759,511 | A | | 9/1973 | Zinkin et al. |
| 3,770,267 | A | | 11/1973 | McCarthy |
| 3,792,860 | A | | 2/1974 | Selnes |
| 3,814,420 | A | | 6/1974 | Encke |
| 3,824,994 | A | | 7/1974 | Soderberg, Sr. |
| 3,826,491 | A | | 7/1974 | Elder |
| 3,870,297 | A | | 3/1975 | Elder |
| 3,874,657 | A | | 4/1975 | Niebojewski |
| 3,892,404 | A | | 7/1975 | Martucci |
| 3,896,925 | A | | 7/1975 | Mitsui et al. |
| 3,918,710 | A | | 11/1975 | Niebojewski |
| 3,948,351 | A | | 4/1976 | Baumann |
| 3,956,976 | A | | 5/1976 | Vogel et al. |
| 3,962,595 | A | | 6/1976 | Eddens |
| 3,963,101 | A | | 6/1976 | Stadelmann et al. |
| 3,966,182 | A | | 6/1976 | Stadelmann et al. |
| 3,970,302 | A | | 7/1976 | McFee |
| 4,023,466 | A | | 5/1977 | Strassheimer |
| 4,026,545 | A | | 5/1977 | Schonenberger |
| 4,066,257 | A | | 1/1978 | Moller |
| 4,072,309 | A | | 2/1978 | Wilson |
| 4,085,344 | A | | 4/1978 | Eddens |
| 4,093,196 | A | | 6/1978 | Bauer |
| 4,131,266 | A | | 12/1978 | Carter |
| 4,140,312 | A | | 2/1979 | Buchmann |
| 4,151,988 | A | | 5/1979 | Nabinger |
| 4,157,179 | A | | 6/1979 | Ecklor, Jr. |
| 4,185,622 | A | | 1/1980 | Swenson |
| 4,194,442 | A | | 3/1980 | Martelli |
| 4,204,673 | A | | 5/1980 | Speer, Sr. |
| 4,240,627 | A | | 12/1980 | Brentham |
| 4,248,476 | A | | 2/1981 | Phelps |
| 4,270,749 | A | | 6/1981 | Hebern |
| 4,300,761 | A | | 11/1981 | Howard |
| 4,316,609 | A | | 2/1982 | Silberman |
| 4,319,747 | A | | 3/1982 | Rogers |
| D263,978 | S | | 4/1982 | Brentham |
| 4,334,676 | A | | 6/1982 | Schonenberger |
| 4,344,616 | A | | 8/1982 | Ogden |
| 4,350,336 | A | | 9/1982 | Hanford |
| 4,350,913 | A | | 9/1982 | Eddens |
| 4,358,105 | A | | 11/1982 | Sweeney, Jr. |
| 4,363,480 | A | | 12/1982 | Fisher et al. |
| 4,364,556 | A | | 12/1982 | Otte |
| 4,369,966 | A | | 1/1983 | Silberman et al. |
| 4,370,766 | A | | 2/1983 | Teague, Jr. |
| 4,374,587 | A | | 2/1983 | Ogden |
| 4,383,714 | A | | 5/1983 | Ishida |
| 4,411,342 | A | | 10/1983 | Katsumori et al. |
| 4,422,635 | A | | 12/1983 | Herod et al. |
| 4,423,864 | A | | 1/1984 | Wiik |
| 4,445,683 | A | | 5/1984 | Ogden |
| 4,452,448 | A | | 6/1984 | Ausherman |
| 4,462,252 | A | | 7/1984 | Smidt et al. |
| 4,470,597 | A | | 9/1984 | McFee |
| 4,477,071 | A | | 10/1984 | Brown et al. |
| 4,480,832 | A | | 11/1984 | Bulmash et al. |
| 4,492,375 | A | | 1/1985 | Connelly |
| 4,502,679 | A | | 3/1985 | De Lorenzo |
| 4,509,510 | A | | 4/1985 | Hook |
| 4,509,742 | A | | 4/1985 | Cones |
| 4,521,013 | A | | 6/1985 | Dofel |
| D280,224 | S | | 8/1985 | Wilson |
| 4,563,001 | A | | 1/1986 | Terauds |
| 4,566,689 | A | | 1/1986 | Ogden |
| 4,572,500 | A | | 2/1986 | Weiss |
| 4,576,352 | A | | 3/1986 | Ogden |
| D283,239 | S | | 4/1986 | Smith et al. |
| 4,582,320 | A | | 4/1986 | Shaw |
| 4,588,065 | A | | 5/1986 | Maiden et al. |
| 4,591,147 | A | | 5/1986 | Smith et al. |
| D284,597 | S | | 7/1986 | Smith et al. |
| 4,600,187 | A | | 7/1986 | Schenker |
| 4,600,196 | A | | 7/1986 | Jones |
| 4,602,779 | A | | 7/1986 | Ogden |
| 4,614,337 | A | | 9/1986 | Schonenberger |
| 4,616,822 | A | | 10/1986 | Trulaske et al. |
| 4,618,144 | A | | 10/1986 | Gibson |
| 4,621,623 | A | | 11/1986 | Wang |
| 4,625,962 | A | | 12/1986 | Street |
| 4,627,619 | A | | 12/1986 | Rockwell et al. |
| 4,629,062 | A | | 12/1986 | Silverthorn et al. |
| 4,632,385 | A | | 12/1986 | Geraci |
| 4,635,927 | A | | 1/1987 | Shu |
| 4,635,928 | A | | 1/1987 | Ogden et al. |
| 4,643,418 | A | | 2/1987 | Bart |
| 4,645,197 | A | | 2/1987 | McFee |
| 4,645,200 | A | | 2/1987 | Hix |
| 4,659,077 | A | | 4/1987 | Stropkay |
| D289,668 | S | | 5/1987 | Gremonprez et al. |
| 4,664,371 | A | | 5/1987 | Viander |
| 4,664,646 | A | | 5/1987 | Rorabaugh |
| 4,679,787 | A | | 7/1987 | Guilbault |
| 4,681,316 | A | | 7/1987 | DeCloux |
| 4,687,195 | A | | 8/1987 | Potts |
| 4,690,398 | A | | 9/1987 | Smith |
| 4,708,337 | A | | 11/1987 | Shyu |

4,708,338 A 11/1987 Potts
4,720,093 A 1/1988 Del Mar
4,726,583 A 2/1988 Olsen et al.
4,729,558 A 3/1988 Kuo
4,749,181 A 6/1988 Pittaway et al.
4,750,735 A 6/1988 Furgerson et al.
4,757,987 A 7/1988 Allemand
4,759,540 A 7/1988 Yu et al.
4,766,996 A 8/1988 Gibson
4,786,050 A 11/1988 Geschwender
4,792,134 A 12/1988 Chen
4,796,881 A 1/1989 Watterson
4,799,676 A 1/1989 Sheppard et al.
4,805,901 A 2/1989 Kulick
4,819,583 A 4/1989 Guerra
4,826,153 A 5/1989 Schalip
4,830,362 A * 5/1989 Bull ..... 482/53
4,836,543 A 6/1989 Holzer
4,838,543 A 6/1989 Armstrong et al.
4,842,266 A 6/1989 Sweeney, Sr. et al.
4,844,449 A 7/1989 Truslaske
4,848,737 A 7/1989 Ehrenfield
4,852,874 A 8/1989 Sleichter, III et al.
4,854,577 A 8/1989 Sims
D303,414 S 9/1989 Armstrong et al.
4,869,494 A 9/1989 Lambert, Sr.
4,881,934 A 11/1989 Harston et al.
4,886,266 A 12/1989 Trulaske
4,905,330 A 3/1990 Jacobs
4,913,396 A 4/1990 Dalebout et al.
4,913,423 A 4/1990 Farran et al.
4,918,766 A 4/1990 Leonaggeo, Jr.
4,921,247 A 5/1990 Sterling
4,927,138 A 5/1990 Ferrari
4,938,473 A 7/1990 Lee et al.
4,944,518 A 7/1990 Flynn
4,949,954 A 8/1990 Hix
4,949,993 A 8/1990 Stark et al.
4,958,830 A 9/1990 Huggins et al.
4,959,040 A 9/1990 Gardner et al.
4,974,831 A 12/1990 Dunham
D313,826 S 1/1991 Birrell et al.
4,984,810 A 1/1991 Stearns et al.
4,989,858 A 2/1991 Young et al.
4,998,725 A 3/1991 Watterson et al.
5,000,440 A 3/1991 Lynch
5,002,271 A 3/1991 Gonzales
5,007,630 A 4/1991 Real et al.
5,013,031 A 5/1991 Bull
5,019,029 A 5/1991 Calvert
5,026,046 A 6/1991 DeCloux
5,028,801 A 7/1991 Gerdt
5,029,801 A 7/1991 Dalebout et al.
5,039,088 A 8/1991 Shifferaw
5,040,786 A 8/1991 Jou
5,048,821 A * 9/1991 Kuo-Liang ..... 482/53
5,054,770 A 10/1991 Bull
5,058,881 A 10/1991 Measom
5,058,882 A 10/1991 Dalebout et al.
5,061,231 A 10/1991 Dietrich et al.
D321,734 S 11/1991 Dunham et al.
5,062,627 A 11/1991 Bingham
5,067,937 A 11/1991 Aschaber et al.
5,071,115 A 12/1991 Welch
5,072,928 A 12/1991 Stearns et al.
5,078,389 A 1/1992 Chen
5,078,669 A 1/1992 Dietrich et al.
5,081,991 A 1/1992 Chance
5,085,426 A 2/1992 Wanzer et al.
5,088,729 A 2/1992 Dalebout
5,090,690 A 2/1992 Huang
5,100,127 A 3/1992 Melnick et al.
5,102,380 A 4/1992 Jacobson et al.
5,102,385 A 4/1992 Calvert
5,105,931 A 4/1992 Lashyro
D326,491 S * 5/1992 Dalebout ..... D21/670
5,109,778 A 5/1992 Berkowitz et al.
5,110,117 A 5/1992 Fisher et al.
5,114,388 A 5/1992 Trulaske
5,114,389 A 5/1992 Brentham
5,129,872 A 7/1992 Dalton et al.
5,129,873 A 7/1992 Henderson et al.
5,131,895 A 7/1992 Rogers, Jr.
D328,770 S 8/1992 Henderson et al.
5,135,216 A 8/1992 Bingham et al.
5,135,447 A 8/1992 Robards, Jr. et al.
5,139,470 A 8/1992 Wang
5,141,479 A 8/1992 Vanjani et al.
5,160,302 A 11/1992 Li
5,163,885 A 11/1992 Wanzer et al.
5,163,888 A 11/1992 Stearns
5,180,353 A 1/1993 Snyderman
5,183,449 A 2/1993 DeCloux
5,184,988 A 2/1993 Dunham
5,188,577 A 2/1993 Young et al.
5,190,505 A 3/1993 Dalebout et al.
5,192,255 A 3/1993 Dalebout et al.
5,199,932 A 4/1993 Liao
5,199,934 A * 4/1993 Lin ..... 482/79
5,203,800 A 4/1993 Meredith
5,205,800 A 4/1993 Grant
5,207,621 A 5/1993 Koch et al.
5,207,622 A 5/1993 Wilkinson et al.
5,207,628 A 5/1993 Graham
5,209,714 A 5/1993 Sainte et al.
5,215,515 A 6/1993 Bershadsky
5,232,421 A 8/1993 Chen et al.
5,236,407 A 8/1993 Wang
5,238,462 A 8/1993 Cinke et al.
5,242,343 A 9/1993 Miller
5,246,410 A 9/1993 Fun
5,251,742 A 10/1993 Campbell
5,254,067 A 10/1993 Habing et al.
5,256,117 A 10/1993 Potts et al.
5,263,910 A 11/1993 Yang
5,267,923 A 12/1993 Piaget et al.
5,277,677 A 1/1994 Terauds
5,279,528 A 1/1994 Dalebout et al.
5,282,776 A 2/1994 Dalebout
5,282,992 A 2/1994 Reichgott
5,290,204 A 3/1994 Lee
5,290,205 A 3/1994 Densmore et al.
5,290,211 A 3/1994 Stearns
5,299,992 A 4/1994 Wilkinson
5,299,993 A 4/1994 Habing
5,302,162 A 4/1994 Pasero
5,304,105 A 4/1994 Hsieh
5,318,490 A 6/1994 Henderson et al.
5,320,588 A 6/1994 Wanzer et al.
5,322,491 A 6/1994 Wanzer et al.
5,323,784 A 6/1994 Shu
5,330,397 A 7/1994 Prince et al.
5,330,401 A 7/1994 Walstead
5,335,146 A 8/1994 Stucke
5,336,144 A 8/1994 Rodden
5,336,146 A * 8/1994 Piaget et al. ..... 482/54
5,338,271 A 8/1994 Wang
5,344,371 A 9/1994 Wang
5,346,452 A 9/1994 Ku
5,352,167 A 10/1994 Ulicny
5,352,169 A 10/1994 Eschenbach
5,368,532 A 11/1994 Farnet
5,372,559 A 12/1994 Dalebout et al.
5,372,560 A 12/1994 Chang
5,374,227 A 12/1994 Webb
5,382,207 A 1/1995 Skowronski et al.
5,383,829 A 1/1995 Miller
5,401,226 A 3/1995 Stearns
RE34,959 E 5/1995 Potts
5,411,454 A 5/1995 Chang
5,429,563 A 7/1995 Engel et al.
D360,915 S 8/1995 Bostic et al.
5,441,467 A 8/1995 Stevens
5,441,468 A 8/1995 Deckers et al.
5,445,583 A 8/1995 Habing
5,454,772 A 10/1995 Rodden
5,480,365 A 1/1996 Lundin et al.
5,484,362 A 1/1996 Skowronski et al.

5,489,250 A 2/1996 Densmore et al.
5,492,517 A 2/1996 Bostic et al.
5,499,956 A 3/1996 Habing et al.
5,509,872 A 4/1996 Chen
5,512,025 A 4/1996 Dalebout et al.
5,514,068 A 5/1996 Calvert et al.
5,518,470 A 5/1996 Piaget et al.
5,518,473 A 5/1996 Miller
5,527,245 A 6/1996 Dalebout et al.
5,536,231 A 7/1996 Nilsson
5,538,489 A 7/1996 Magid
5,542,892 A 8/1996 Buhler
5,545,112 A 8/1996 Densmore et al.
D373,805 S 9/1996 Rawls et al.
5,558,604 A 9/1996 Hopkins
5,562,574 A 10/1996 Miller
D376,828 S 12/1996 Conley et al.
5,591,106 A 1/1997 Dalebout et al.
5,595,554 A 1/1997 Maresh
5,595,556 A 1/1997 Dalebout et al.
5,599,259 A 2/1997 Skowronski et al.
5,607,375 A 3/1997 Dalebout et al.
5,611,758 A 3/1997 Rodgers, Jr.
5,622,527 A 4/1997 Watterson et al.
5,626,538 A 5/1997 Dalebout et al.
5,626,539 A 5/1997 Piaget et al.
5,645,512 A 7/1997 Yu
5,649,882 A 7/1997 Parikh et al.
5,650,709 A 7/1997 Rotunda et al.
5,658,223 A 8/1997 Habing et al.
5,662,557 A 9/1997 Watterson et al.
5,665,033 A 9/1997 Palmer
5,669,856 A 9/1997 Liu ..... 482/51
5,669,857 A 9/1997 Watterson et al.
5,672,140 A 9/1997 Watterson et al.
5,674,156 A 10/1997 Watterson et al.
5,674,453 A 10/1997 Watterson et al.
5,676,624 A 10/1997 Watterson et al.
5,683,332 A 11/1997 Watterson et al.
5,685,804 A 11/1997 Whan-Tong et al.
5,702,305 A 12/1997 Norman et al.
5,702,325 A 12/1997 Watterson et al.
5,704,879 A 1/1998 Watterson et al.
5,711,745 A 1/1998 Yang
5,718,657 A 2/1998 Dalebout et al.
5,722,922 A 3/1998 Watterson et al.
5,741,205 A 4/1998 Doll et al.
5,743,833 A 4/1998 Watterson et al.
5,746,682 A 5/1998 Hung
5,747,955 A 5/1998 Rotunda et al.
5,749,807 A 5/1998 Webb
5,752,897 A 5/1998 Skowronski et al.
5,759,135 A 6/1998 Chen
5,762,587 A 6/1998 Dalebout et al.
5,762,588 A 6/1998 Chen
5,772,560 A 6/1998 Watterson et al.
5,779,599 A 7/1998 Chen
5,782,723 A 7/1998 Kuo
5,792,029 A 8/1998 Gordon
5,803,870 A 9/1998 Buhler
5,803,880 A 9/1998 Allen
5,810,696 A 9/1998 Webb
5,827,155 A 10/1998 Jensen et al.
D400,941 S 11/1998 Allen
5,836,855 A 11/1998 Eschenbach
5,853,352 A 12/1998 Login
5,855,537 A 1/1999 Coody et al.
5,856,736 A 1/1999 Rotunda et al.
5,860,893 A 1/1999 Watterson et al.
5,860,894 A 1/1999 Dalebout et al.
D406,621 S 3/1999 Piaget
5,879,270 A 3/1999 Huish et al.
D407,771 S 4/1999 Garza
5,897,459 A 4/1999 Habing et al.
5,899,833 A 5/1999 Ryan et al.
5,899,834 A 5/1999 Dalebout et al.
5,908,373 A 6/1999 Pitre
5,910,072 A 6/1999 Rawls et al.
5,916,065 A 6/1999 McBride et al.
5,921,894 A 7/1999 Eschenbach
5,938,570 A 8/1999 Maresh
5,947,872 A 9/1999 Ryan et al.
5,951,441 A 9/1999 Dalebout et al.
5,964,682 A 10/1999 Sokol
5,967,944 A 10/1999 Vittone et al.
6,013,011 A 1/2000 Moore et al.
D421,779 S 3/2000 Piaget et al.
6,033,344 A 3/2000 Trulaske et al.
6,033,347 A 3/2000 Dalebout et al.
6,042,514 A 3/2000 Abelbeck
6,042,518 A 3/2000 Hildebrandt et al.
6,050,921 A 4/2000 Wang
6,077,197 A 6/2000 Stearns et al.
D429,509 S 8/2000 Garza
6,095,951 A 8/2000 Skowronski et al.
6,106,439 A 8/2000 Boland
6,113,518 A 9/2000 Maresh et al.
6,117,053 A 9/2000 Chiu
6,123,646 A 9/2000 Colassi
6,132,340 A 10/2000 Wang et al.
6,174,267 B1 1/2001 Dalebout et al.
6,179,753 B1 1/2001 Barker et al.
6,234,936 B1 5/2001 Wang
6,258,012 B1 7/2001 Yoshimura
6,280,362 B1 8/2001 Dalebout et al.
6,312,363 B1 11/2001 Watterson et al.
6,328,676 B1 12/2001 Alessandri
6,350,218 B1 2/2002 Dalebout et al.
6,413,195 B1 7/2002 Barzelay
6,436,008 B1 8/2002 Skowronski et al.
6,447,424 B1 9/2002 Ashby et al.
6,450,923 B1 9/2002 Vatti
6,458,060 B1 10/2002 Watterson et al.
6,461,279 B1 10/2002 Kuo
6,471,622 B1 10/2002 Hammer et al.
6,569,062 B2 5/2003 Wang et al.
6,572,513 B1 6/2003 Whan-Tong et al.
6,589,138 B2 7/2003 Dyer et al.
6,626,803 B1 9/2003 Oglesby et al.
6,743,153 B2 6/2004 Watterson et al.
6,811,519 B2 11/2004 Kuo
6,893,383 B1 5/2005 Chang et al.
7,097,593 B2 8/2006 Chang et al.
D534,973 S 1/2007 Flick et al.
7,306,546 B2 12/2007 Lo
7,316,632 B2 1/2008 Rodgers, Jr.
2001/0016542 A1* 8/2001 Yoshimura ..... 482/54
2002/0082146 A1 6/2002 Stearns
2003/0040405 A1 2/2003 Watterson et al.
2003/0073545 A1 4/2003 Liu et al.
2003/0125165 A1 7/2003 Trevino et al.
2003/0139261 A1 7/2003 Kuo
2004/0018916 A1 1/2004 Marin et al.
2004/0018917 A1 1/2004 Corbalis et al.
2004/0018918 A1 1/2004 Reyes et al.
2004/0132583 A1 7/2004 Ohrt et al.
2004/0192514 A1 9/2004 Piaget et al.
2004/0214693 A1 10/2004 Piaget et al.
2005/0202939 A1 9/2005 Lull et al.
2005/0209059 A1 9/2005 Crawford et al.
2005/0209060 A1 9/2005 Lull
2005/0209061 A1 9/2005 Crawford et al.
2005/0233864 A1 10/2005 Smith et al.
2005/0245359 A1 11/2005 Lo
2006/0223680 A1 10/2006 Chang
2008/0070758 A1 3/2008 Lull et al.

FOREIGN PATENT DOCUMENTS

CA 644774 7/1962
CA 2018219 C 12/1990
CA 2016756 C 1/1991
CA 2061470 C 9/1992
CA 2143341 C 9/1995
CN 2510102 Y 9/2002
CN 2675190 Y 2/2005
DE 22 25 342 12/1973
DE 24 08 052 A 8/1975
DE 24 08 055 8/1975

| | | | |
|---|---|---|---|
| DE | 25 28 414 | A1 | 5/1976 |
| DE | 29 19 494 | A1 | 11/1980 |
| DE | 36 01 184 | A1 | 7/1987 |
| DE | 38 39 391 | A1 | 6/1989 |
| EP | 0 196 877 | A2 | 10/1986 |
| EP | 0 225 810 | A1 | 6/1987 |
| EP | 0 403 924 | A2 | 12/1990 |
| EP | 0 417 970 | A1 | 3/1991 |
| EP | 0 504 649 | A1 | 9/1992 |
| EP | 0 914 842 | A2 | 5/1999 |
| FR | 1 565 617 | | 3/1969 |
| FR | 2 616 132 | | 12/1988 |
| GB | 1 505 702 | | 3/1978 |
| GB | 2 152 825 | A | 8/1985 |
| GB | 2 272 167 | A | 5/1994 |
| JP | 51-10842 | | 3/1976 |
| SE | 58 213 | | 6/1995 |
| SE | 66 279 | | 10/2000 |
| SE | 66 280 | | 10/2000 |
| SU | 546523 | | 3/1977 |
| SU | 1 265 113 | A1 | 10/1986 |
| SU | 1 297 879 | A1 | 3/1987 |
| SU | 1 567 221 | A1 | 5/1990 |
| TW | 515306 | Y | 12/2002 |
| TW | 547102 | | 8/2003 |
| TW | 547102 | Y | 8/2003 |
| TW | M249682 | | 11/2004 |
| WO | WO 81/01960 | | 7/1981 |
| WO | WO 82/01138 | | 4/1982 |
| WO | WO 92/11905 | | 7/1992 |
| WO | WO 94/20170 | | 9/1994 |
| WO | WO 95/16502 | | 6/1995 |
| WO | WO 99/21620 | | 5/1999 |
| WO | WO 00/06256 | | 2/2000 |
| WO | WO 00/18472 | | 4/2000 |
| WO | WO 00/30717 | | 6/2000 |
| WO | WO 2004/108225 | A1 | 12/2004 |

OTHER PUBLICATIONS

Damark International, Inc. Mail Order Catalog, dated Nov. 17, 1994, cover page and p. 6.

Treadmill Owner's Manual by Formula 22100 Manual Treadmill, date unknown.

Versatile Exercise System; Abstract from Recreation, Sports & Leisure, p. 10 (1986).

Instruction Booklet for "Body Shop 360" by Weslo International, Inc., pp. 1-30, (1984).

Owner's Manual for Weider Flex CTS Cross Training System for Model No. 870300, Weslo, Inc., a Weider Heal and Fitness, Inc. Company, pp. 1-12 (Mar. 1990).

Catalog, Diamond House International Inc., date unknown.

J.K. Exer, Catalog, Jih Kao Ent. Co., Ltd., Date unknown.

"Nautilus Home Health & Fitness Catalog", Nautilus, Inc., pp. 1-56 (2004).

Office Action, U.S. Appl. No. 10/789,294, mailed Dec. 9, 2004, 6 pgs.

Response, U.S. Appl. No. 10/789,294, dated Feb. 9, 2005, 3 pgs.

Office Action and PTO-892, U.S. Appl. No. 10/789,294, mailed May 18, 2005, 6 pgs.

Amendment and Response to Office Action, U.S. Appl. No. 10/789,294, dated Nov. 15, 2005, 11 pgs.

Office Action and PTO-892, U.S. Appl. No. 10/789,294, mailed Feb. 8, 2006, 5 pgs.

Amendment and Response to Office Action, U.S. Appl. No. 10/789,294, dated May 19, 2006, 10 pgs.

Office Action and PTO-892, U.S. Appl. No. 10/789,294, mailed Aug. 8, 2006, 10 pgs.

A Petition for Extension of Time and Response to Office Action, U.S. Appl. No. 10/789,294, dated Feb. 8, 2007, 40 pgs.

Notice of Allowance and PTO-892, U.S. Appl. No. 10/789,294, mailed May 8, 2007, 6 pgs.

Supplemental Notice of Allowance, U.S. Appl. No. 10/789,294, mailed Jun. 13, 2007, 2 pgs.

Preliminary Amendment, U.S. Appl. No. 10/637,628, dated Aug. 23, 2004, 10 pgs.

Office Action and PTO-892, U.S. Appl. No. 10/637,628, mailed Sep. 8, 2004, 6 pgs.

Amendment and Response to Sep. 8, 2004 Office Action, U.S. Appl. No. 10/637,628, mailed Feb. 8, 2005, 5 pgs.

Notice of Allowance, U.S. Appl. No. 10/637,628, mailed Mar. 8, 2005, 4 pgs.

Notice of Allowance, U.S. Appl. No. 10/637,628, mailed Sep. 8, 2005, 4 pgs.

Notice of Allowance, U.S. Appl. No. 10/637,628, mailed Feb. 27, 2006, 4 pgs.

* cited by examiner

TREADMILL HAVING DUAL TREADS FOR STEPPING EXERCISES

Matter enclosed in heavy brackets [ ] appears in the original patent but forms no part of this reissue specification; matter printed in italics indicates the additions made by reissue.

*RELATED U.S. PATENT DOCUMENT*

*The present application is a broadening reissue application of and claiming priority to U.S. Pat. No. 6,461,279 titled "Treadmill Having Dual Treads For Stepping Exercises" issued on Oct. 8, 2002, application Ser. No. 09/912,664, filed Jul. 25, 2001, which is hereby incorporated by reference herein.*

BACKGROUND OF THE INVENTION

1. Field of the Invention

The present invention relates to a treadmill apparatus, and more particularly to a treadmill apparatus having dual treads for conducting both jogging and stepping exercises.

2. Description of the Prior Art

U.S. Pat. No. 5,336,146 to Piaget et al. discloses one of the typical treadmills including dual treads that may be alternatively pivot up and down as a user walks thereon. However, Piaget et al. fail to disclose a coupling device for coupling the two treads together, due to the continuous treads.

The present invention has arisen to mitigate and/or obviate the afore-described disadvantages of the conventional treadmills.

SUMMARY OF THE INVENTION

The primary objective of the present invention is to provide a treadmill apparatus including dual treads for conducting both jogging and stepping exercises.

In accordance with one aspect of the invention, there is provided a treadmill apparatus comprising a base including a first end, and including a second end having a shaft provided thereon, a pair of treadmills disposed above the base, and each including a platform having a roller provided on a first end thereof and attached to the shaft, and each including a tread supported around the platform, means for driving the shaft to actuate the treads, an arm including a middle portion pivotally supported on the base with a pivot axle, and including two ends located below the treadmills respectively, and means for coupling the ends of the arm to the treadmills to elevate a first of the treadmills when a second of the treadmills is lowered, and to elevate the second treadmill when the first treadmill is lowered. The treadmills may thus be moved up and down relative to each other by the arm, and may thus be actuated as a stepping exerciser.

The treadmills each includes a bar attached to the platform thereof and extended downward from the platform for coupling to the ends of the arm respectively.

The ends of the arm each includes a rod provided therein and perpendicular to the arm, and a column pivotally secured to the respective rod, the treadmills each includes a bar attached to the platform thereof and coupled to the column respectively.

A device may further be provided for locking the treadmills together.

A device is further provided for retaining the treads on the platforms respectively and for preventing the treads from being disengaged from the platforms.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
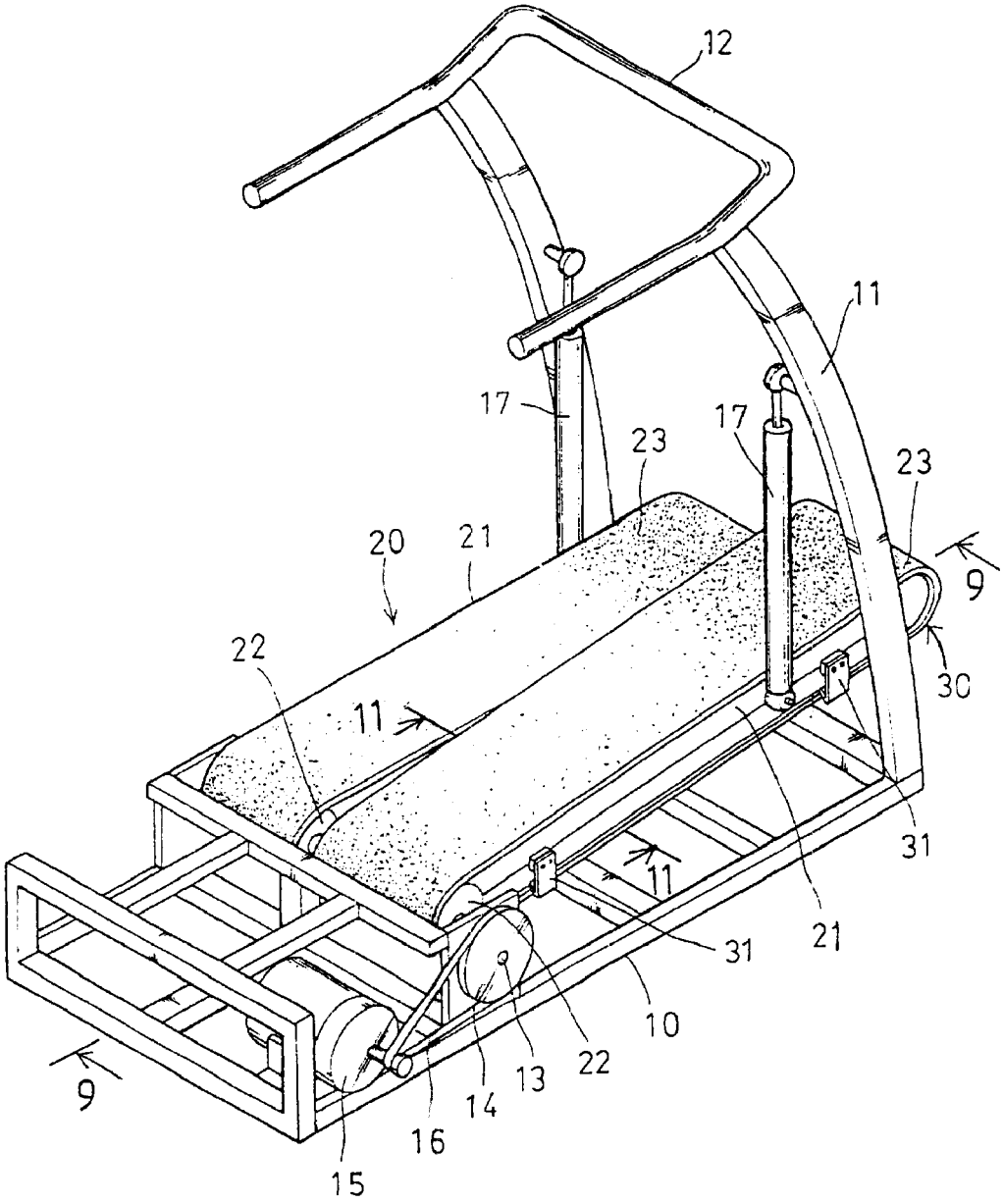
FIG. 1 is a perspective view of a treadmill apparatus in accordance with the present invention.
Figure 2:
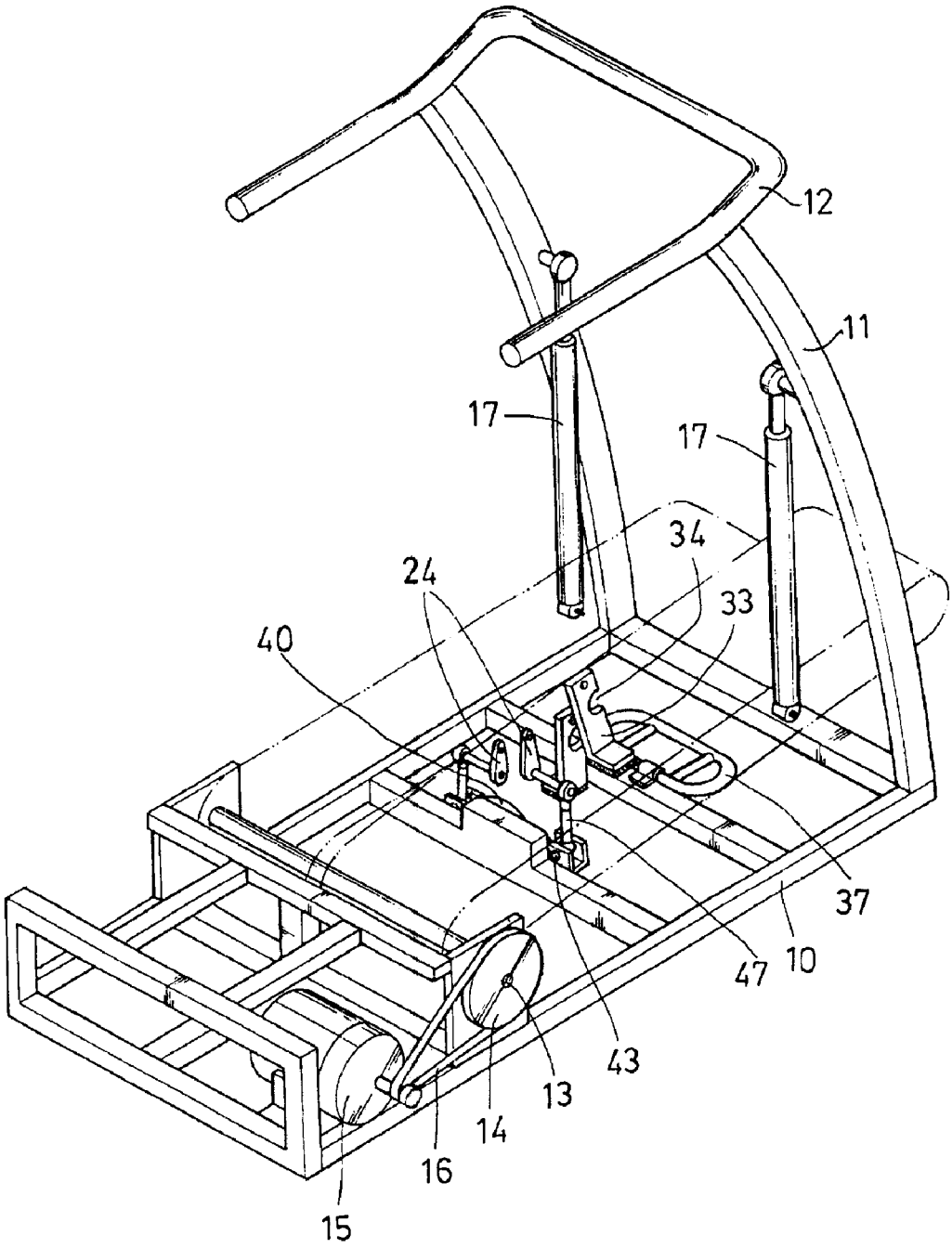
FIG. 2 is a perspective view of the treadmill apparatus, in which the two treads are removed for showing the inner structure of the treadmill apparatus.
Figure 3:
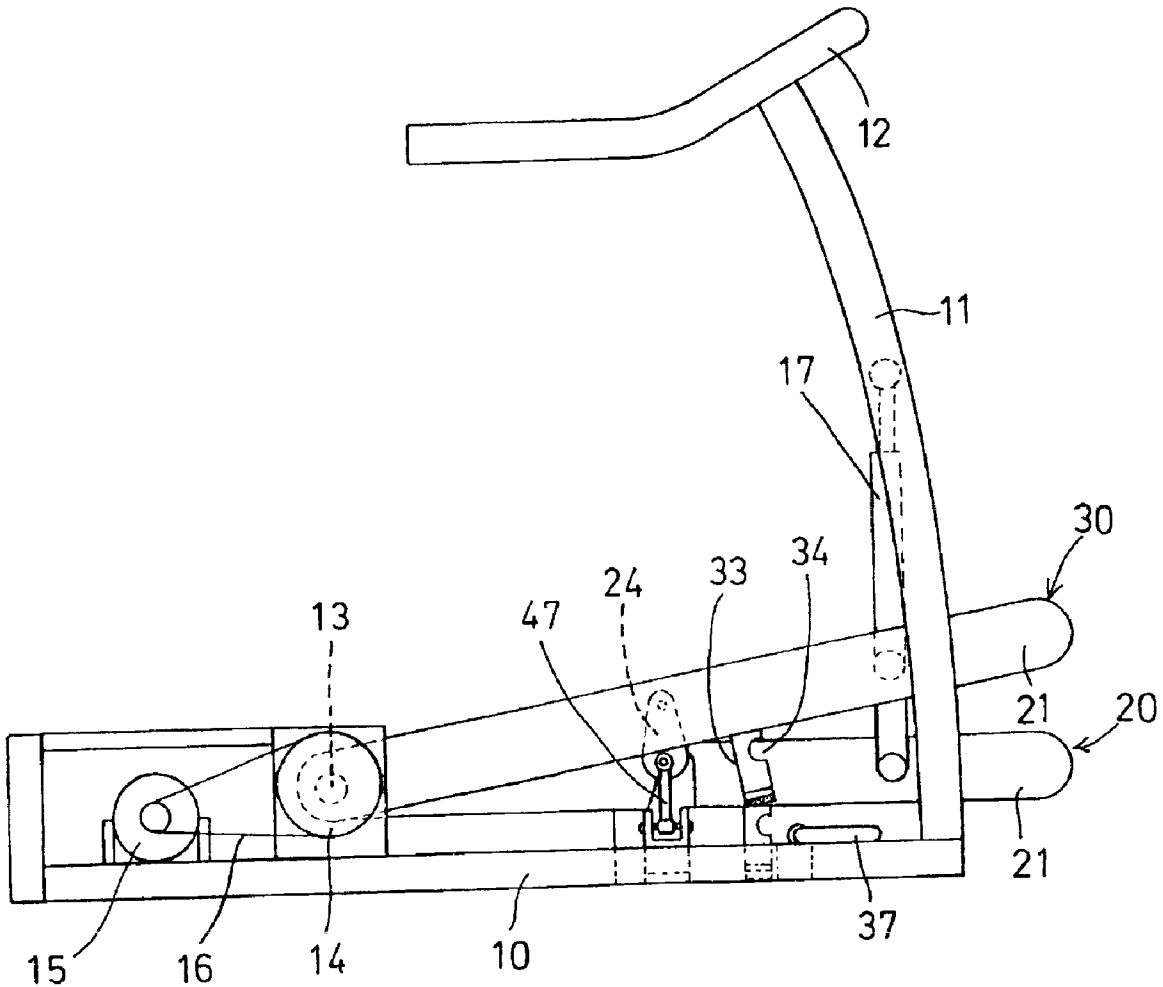
FIGS. 3 and 4 are side plane views illustrating the operation of the treadmill apparatus.
Figure 4:
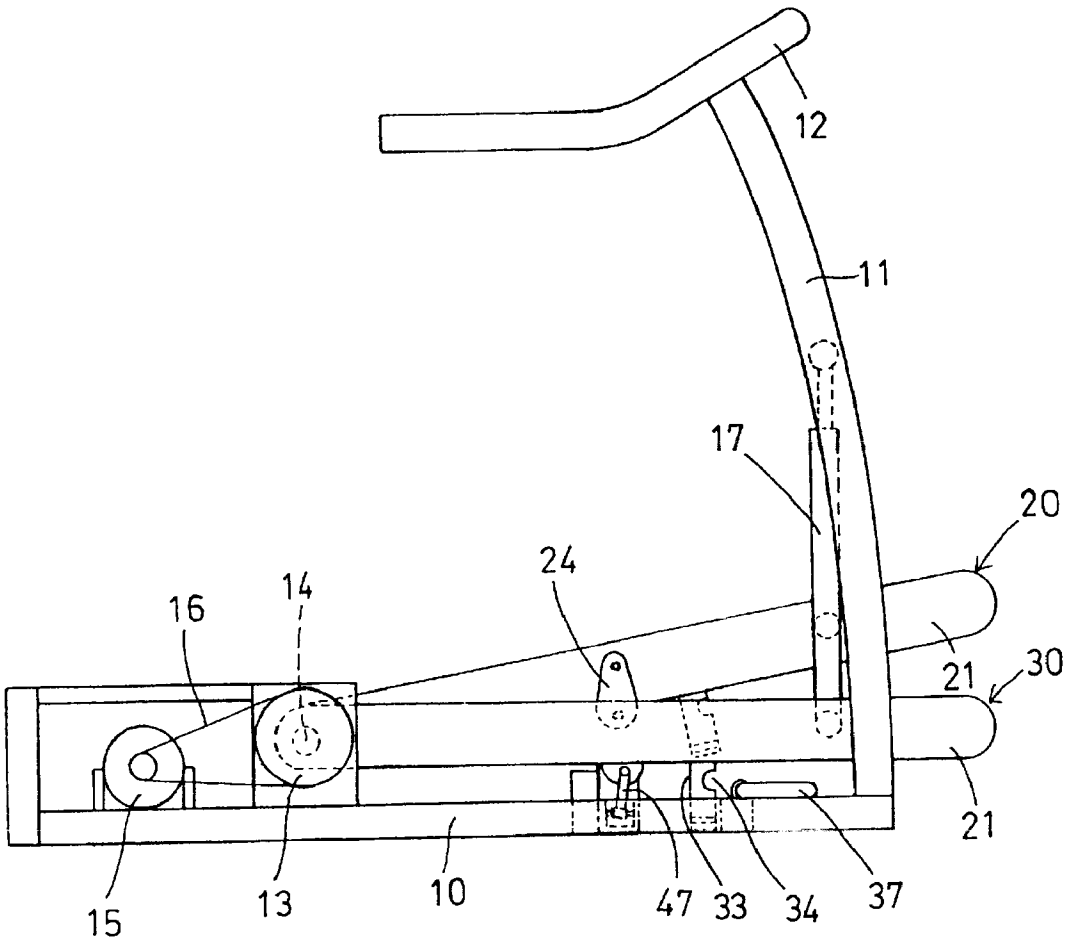
Figure 5:
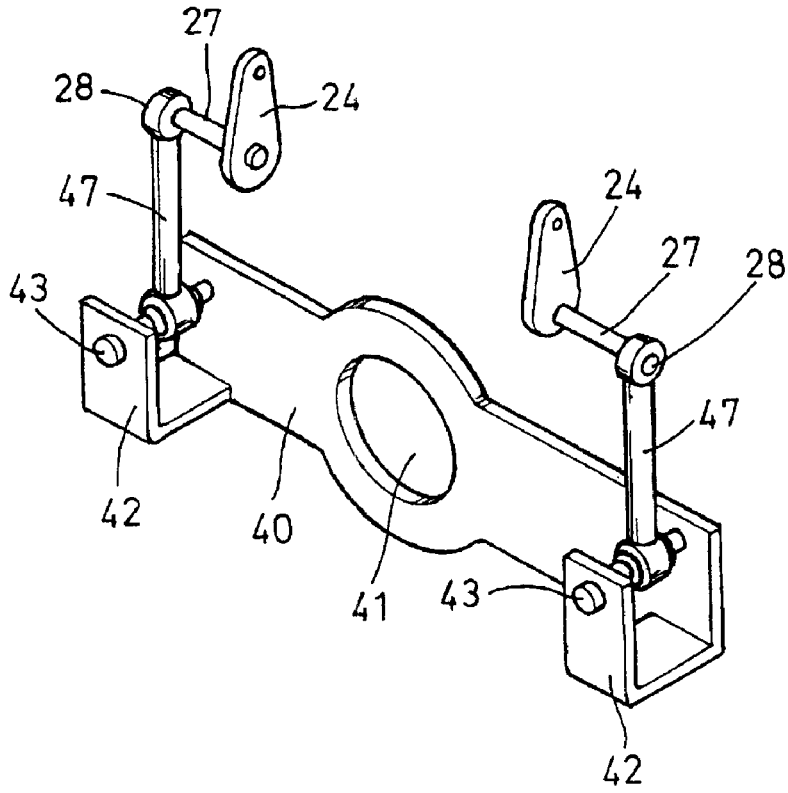
FIG. 5 is a partial perspective view illustrating a coupling device for coupling the treads of the treadmill apparatus together.
Figure 6:
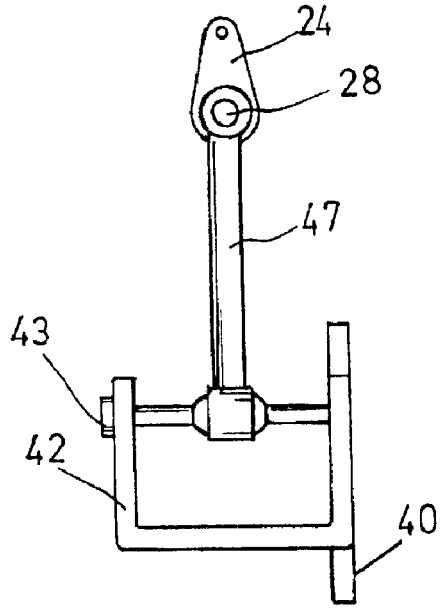
FIG. 6 is a cross sectional view taken along lines 6-6 of FIG. 5.

Referring to the drawings. and initially to FIGS. 1-4, a treadmill apparatus in accordance with the present invention comprises a base 10 including one or more posts 11 extended upward therefrom, such as extended upward from the front portion thereof, and including one or more handles 12 provided on top of the posts 11, and including a shaft 13 rotatably provided on the middle or the rear portion thereof. A wheel 14 or the like is secured to the shaft 13 and rotated in concert with the shaft 13. A motor 15 is disposed on the base 10 and coupled to the wheel 14 and/or the shaft 13 with a transmission device 16, such as a pulley-and-belt or a sprocket-and-chain transmission device 16, such that the shaft 13 may be rotated and driven by the motor 15.

A pair of treadmills 20, 30 are identical in construction, and each preferably includes a rigid treadmill platform 21 having a front end and a rear end, rollers 22 rotatably mounted at each of the front end and the rear end of the platform 21, and a continuous tread 23 extended around the platform 21 and rotatably supported on or around the rollers 22. The rollers 22 may be secured on the shaft 13, such that the rollers 22 and thus the treads 23 may be rotated or driven by the motor 15, and such that the treadmills 20 pivotally mounted on the base 10 in side-by-side adjacent relation by the shaft 13. The rollers 22 may also be separately coupled or secured on the shaft 13 by gearing transmission or the like, for allowing the treads 23 of the two treadmills 20 to be driven separately by the motor 15. Two spring-return hydraulic cylinders or actuators 17 are coupled between the posts 11 and the treadmills 20 respectively for supporting the treadmills 20, such as the front ends of the treadmills 20 in an inclined position. The actuators 17, and/or the construction of the treadmills 20 is considered to be conventional in the art, and therefore no further description is thought to be necessary.

As shown in FIGS. 2-10, the treadmill apparatus in accordance with the present invention further comprises a coupling device for coupling the treadmills together and for allowing the treadmills to be conducted with a stepping exercise. The coupling device includes an arm 40 having an orifice 41 formed in the middle portion thereof (FIGS. 5, 7, 8), for receiving a pivot axle 18 which may rotatably or pivotally securing the arm 40 to the base 10, and for allowing the ends of the arm 40 to be moved; up and down and to be disposed below the treadmills 20, 30 respectively. The ends of the arm 40 each includes a frame 42 provided therein for supporting a rod 43 therein which is about parallel to the longitudinal direction of the base 10 and of the treadmills 20, 30 and which is perpendicular to the arm 40.

Two columns 47 have the lower portions pivotally or rotatably secured onto the respective rods 43 with such as a universal joint or the like. The treadmills 20 each includes a bar 24 secured to the middle portion of the platform 21 thereof and extended downward therefrom and having a lower end pivotally or rotatably secured to the upper end of the column 47 with a rod 27 and a joint 28, such as a universal joint or the like. The treadmills 20 thus may be coupled to the ends of the arm 40 with the bars 24, the rods 27, the joints 28, the columns 47, the pivot rods 43, and the frames 42.

Figure 7:
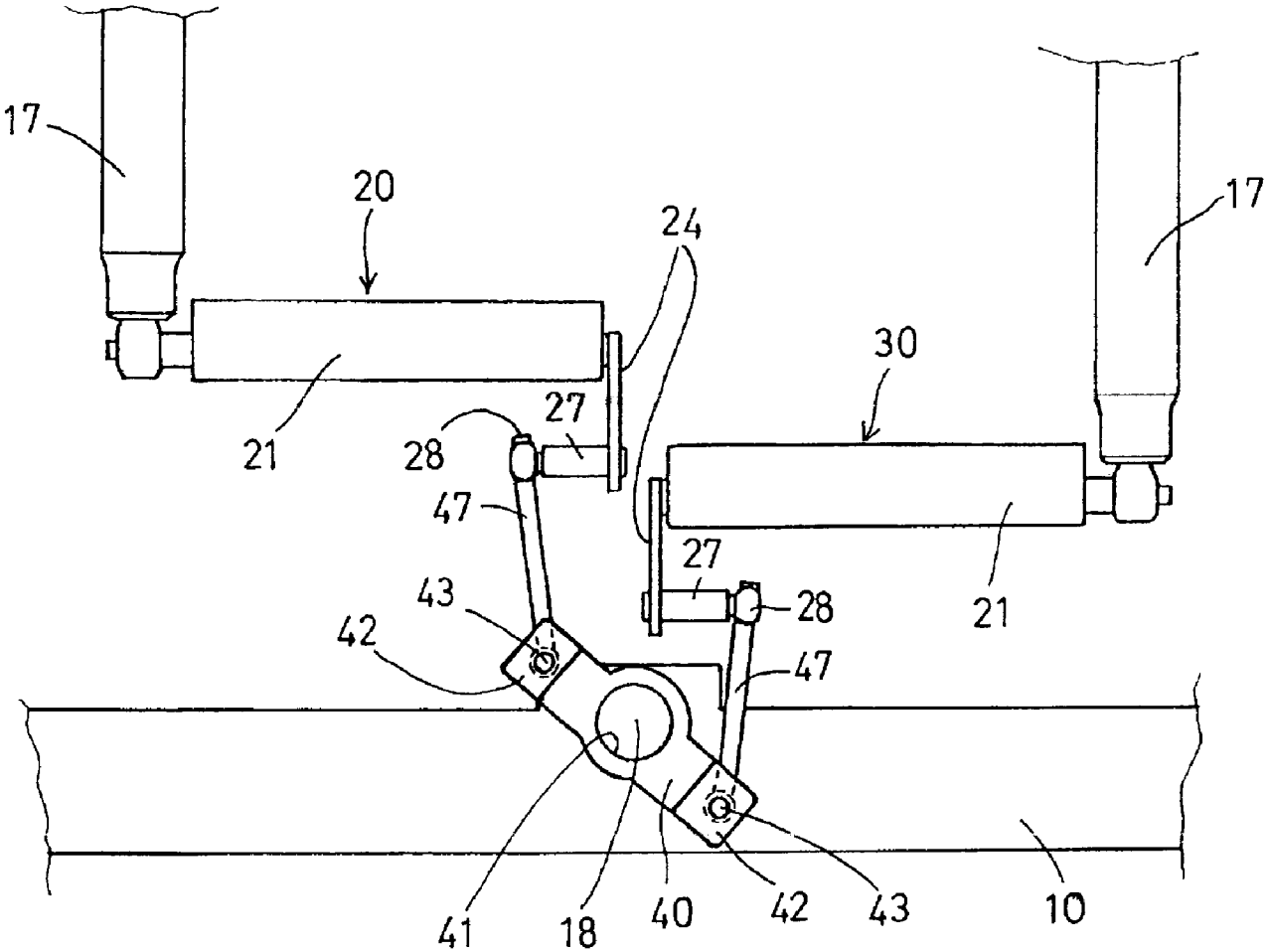
FIGS. 7 and 8 are partial end schematic views illustrating the operation of the treadmill apparatus.
Figure 8:
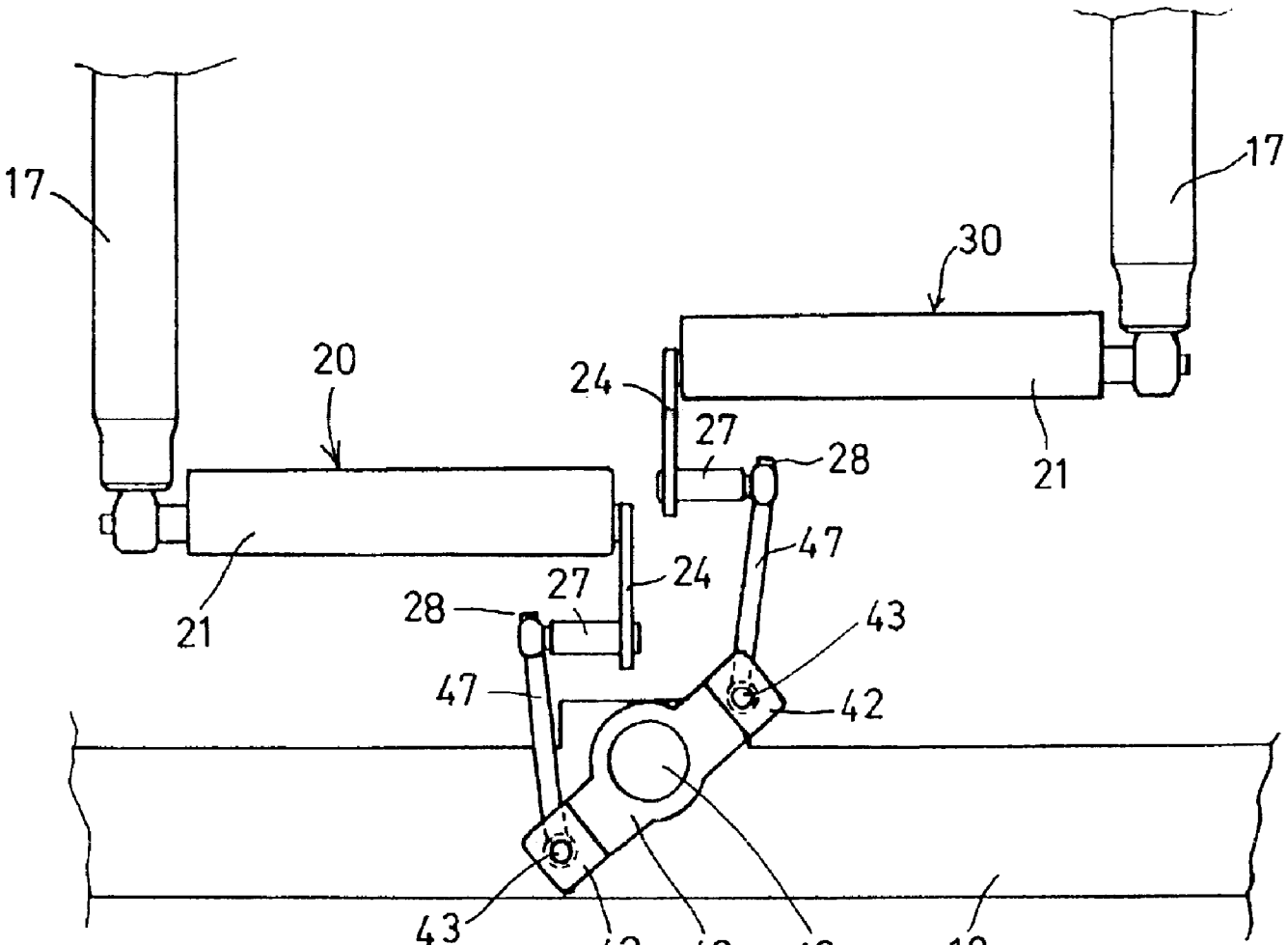
Figure 9:
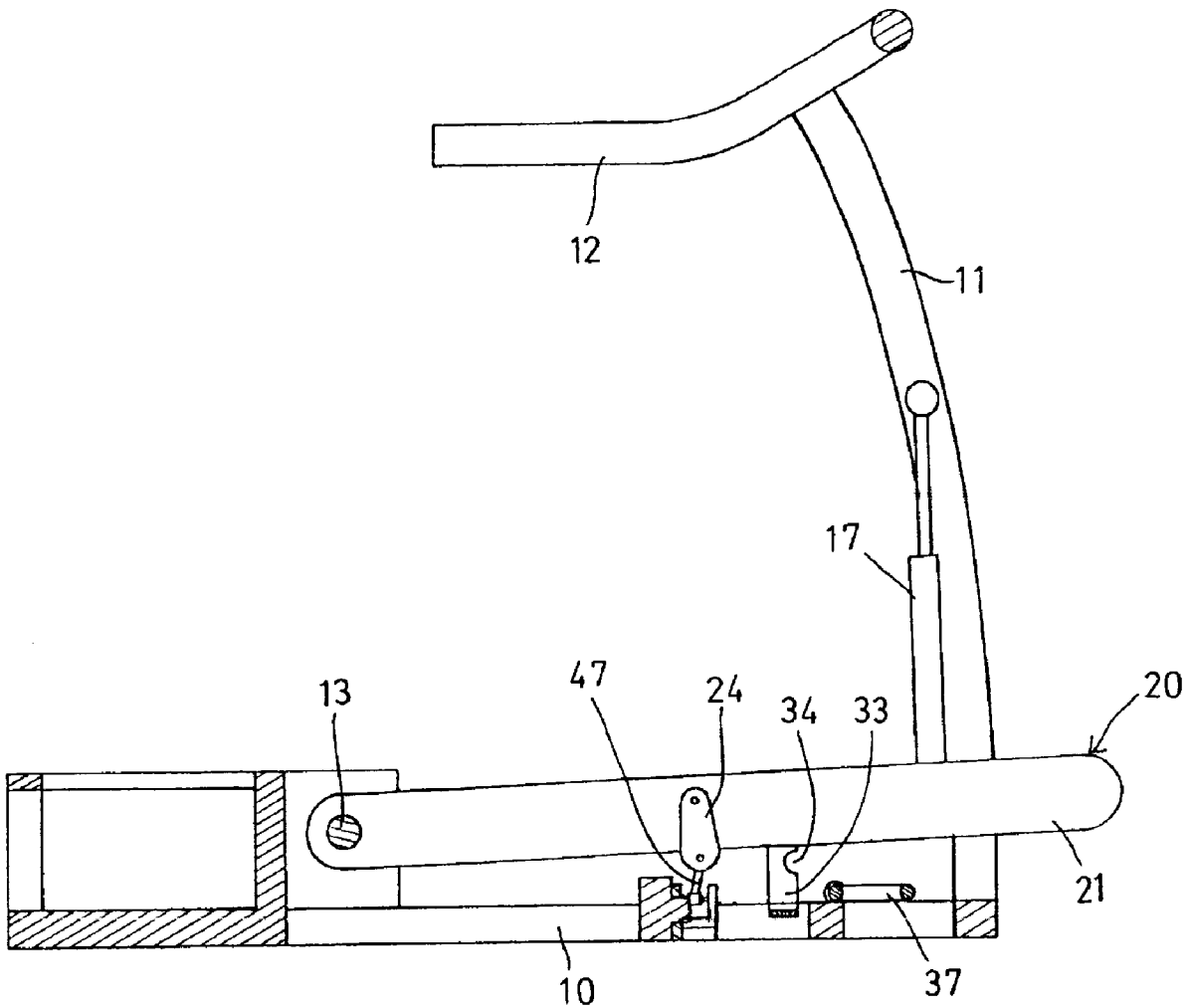
FIG. 9 is a cross sectional view taken along lines 9-9 of FIG. 1.
Figure 10:
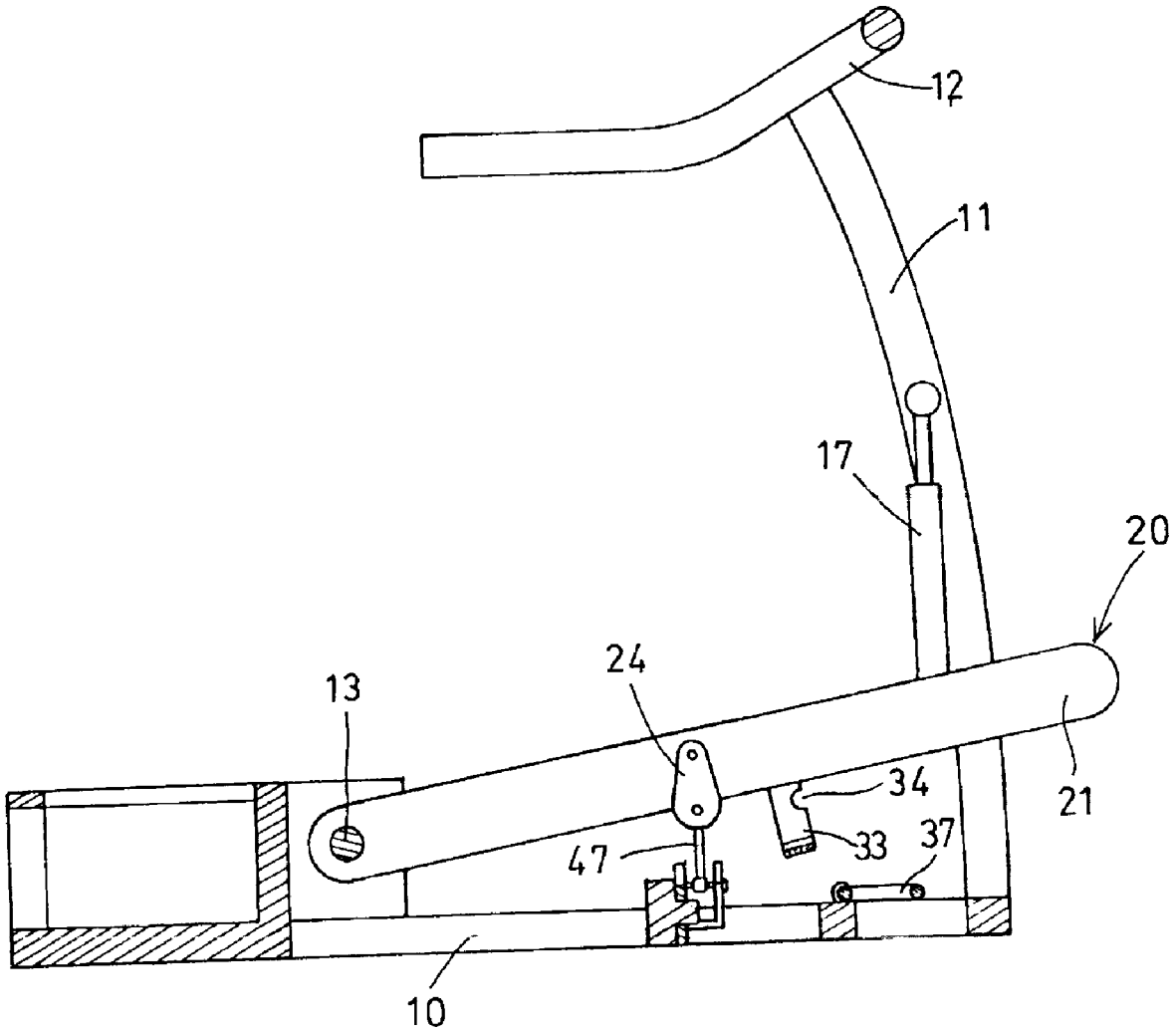
FIG. 10 is a cross sectional view similar to FIG. 9, illustrating the operation of the treadmill apparatus.

In operation, as shown in FIGS. 7 and 8, when one of the treadmills 20 is depressed downward by the user (FIG. 8), the other treadmill 30 will be moved upward by the arm 40. On the contrary, when the treadmill 30 is depressed downward by the user (FIG. 7), the other treadmill 20 will be moved upward by the arm 40, such that the treadmills 20, 30 may be actuated or operated as the stepping exercisers.

Figure 11:
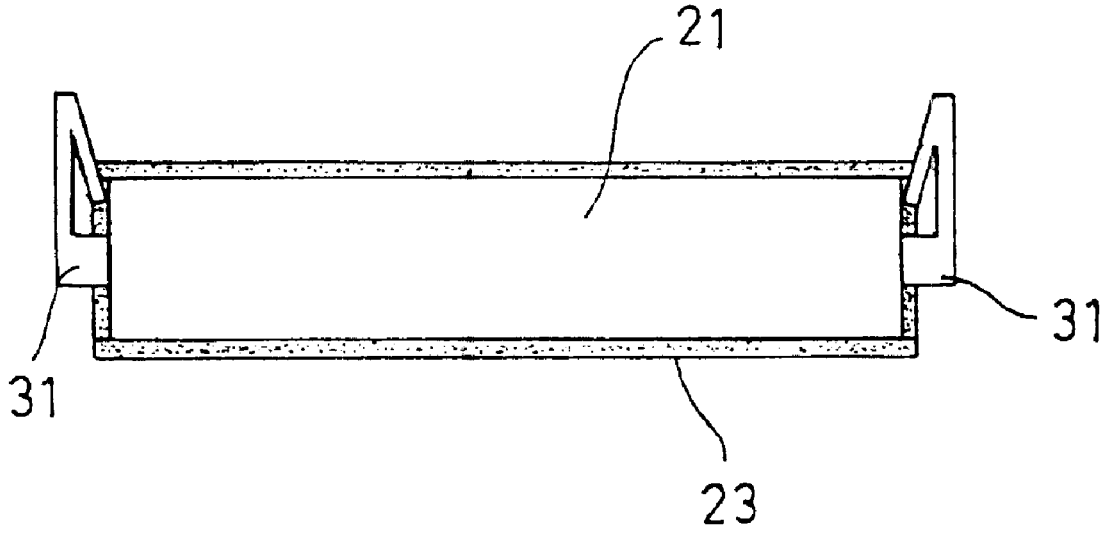
FIG. 11 is a partial cross sectional view taken along lines 11-11 of FIG. 1.

Referring next to FIGS. 1 and 11, the treadmills 20, 30 each includes one or more stops 31 attached to the side portions of the platforms 21 and engaged with the treads 23, for stably retaining the treads 23 within the platforms 21 respectively, and for preventing the treads 23 from being disengaged from the platforms 21 respectively.

Figure 12:
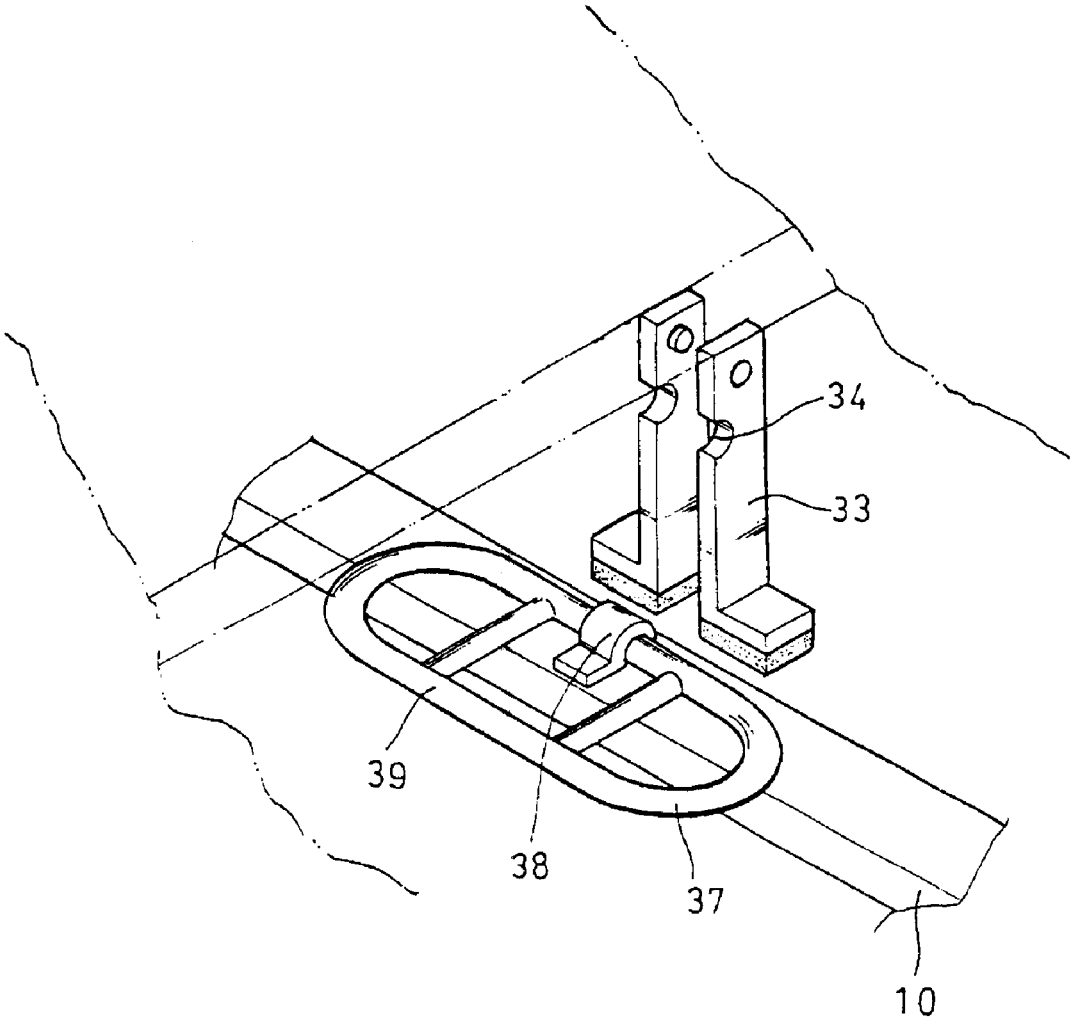
FIG. 12 is a partial perspective view of the treadmill apparatus.
Figure 13:
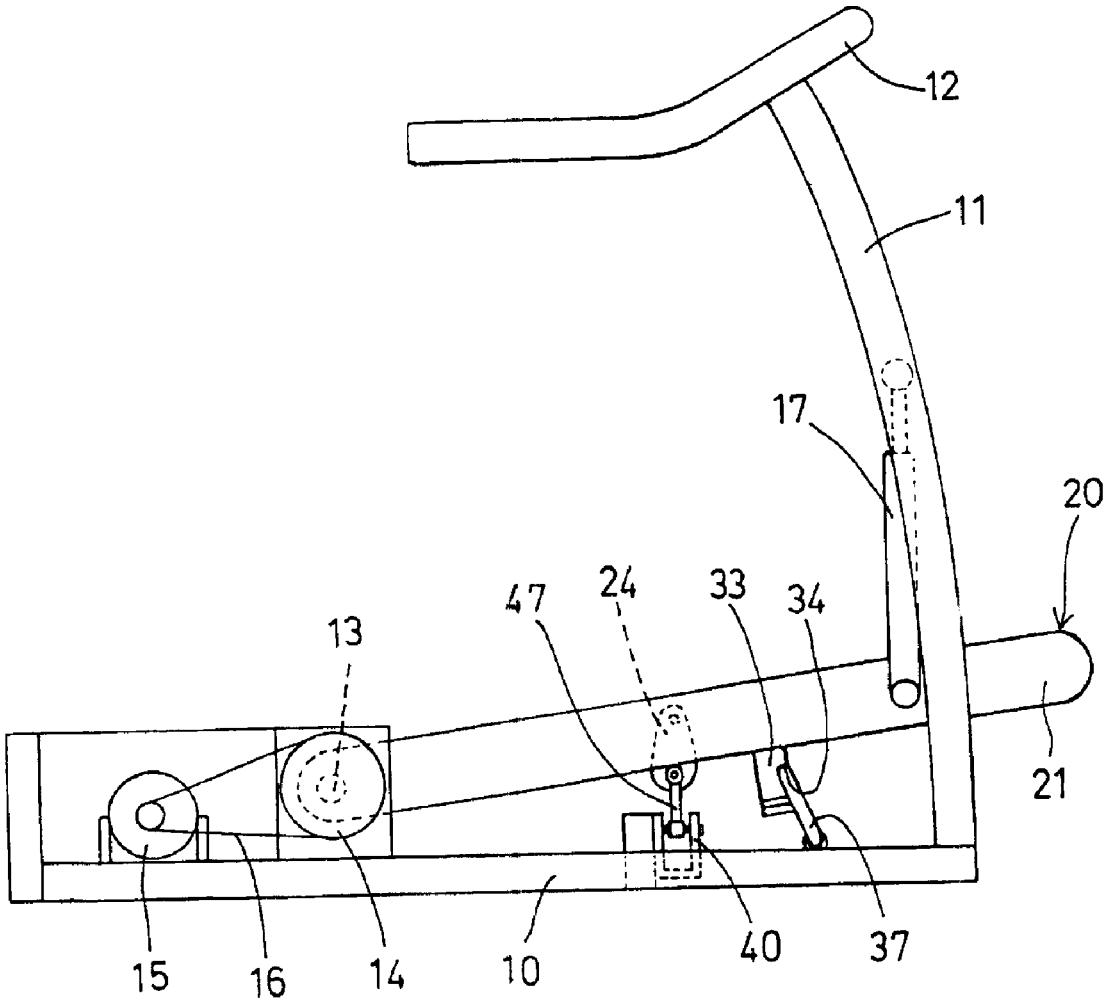
FIG. 13 is a side plane schematic view illustrating the device for locking the two treads of the treadmill apparatus.

Referring next to FIGS. 12 and 13, the treadmills 20, 30 each further includes an extension 33 extended downward therefrom, such as extended downward from the platform 21 thereof. The extensions 33 each includes a notch 34 formed therein. A retaining or locking or latching device 37 is pivotally coupled to or secured to the base 10 with a bracket 38 or the like, and includes a lock member or a latch 39 for engaging into the notches 34 of the extensions 33 and for locking the treadmills 20, 30 together, such that the treadmills 20, 30 may not be moved up and down relative to each other and may be used for conducting the treadmill exercises only.

Figure 14:
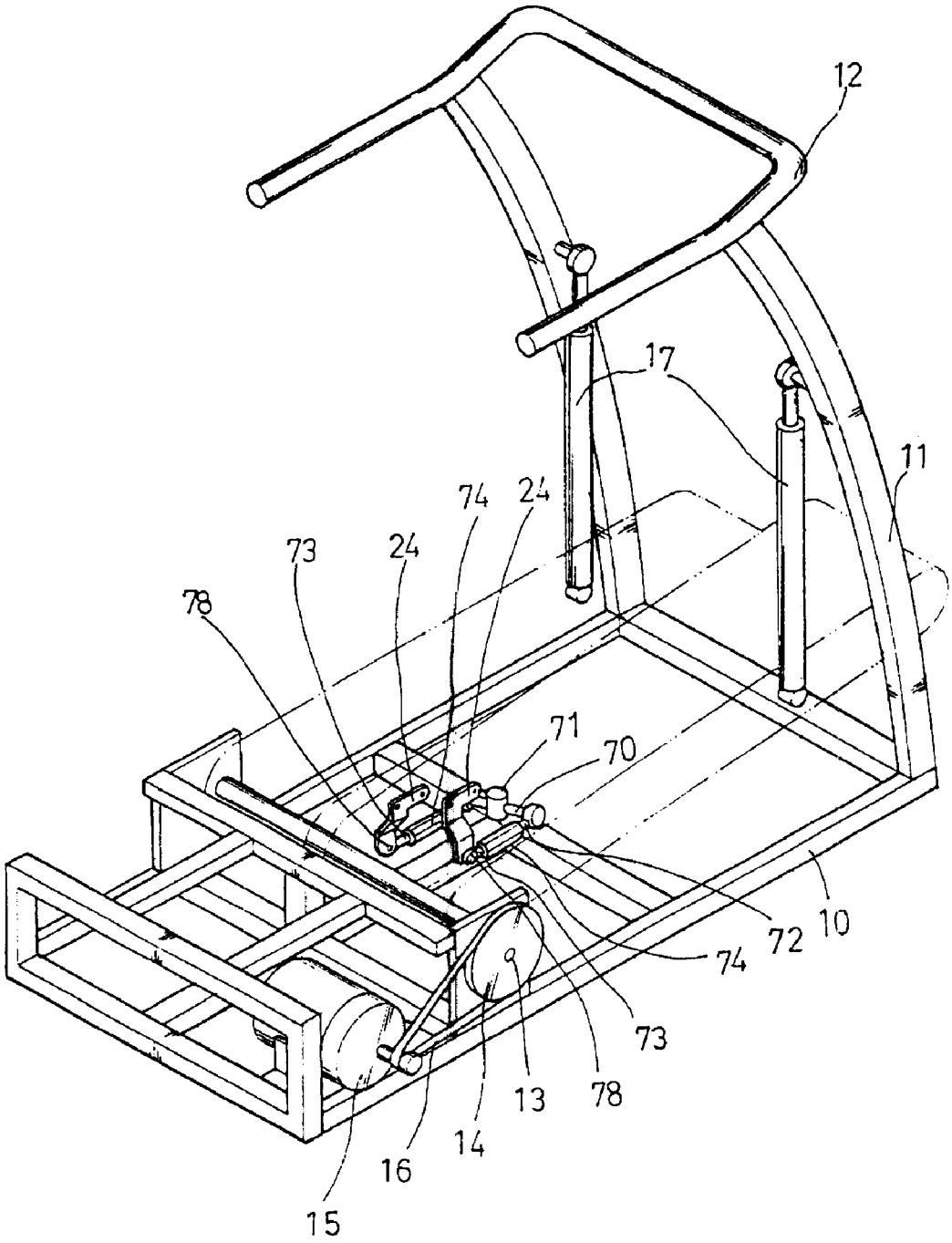
FIG. 14 is a perspective view similar to FIG. 2, illustrating the other embodiment of the treadmill apparatus.
Figure 16:
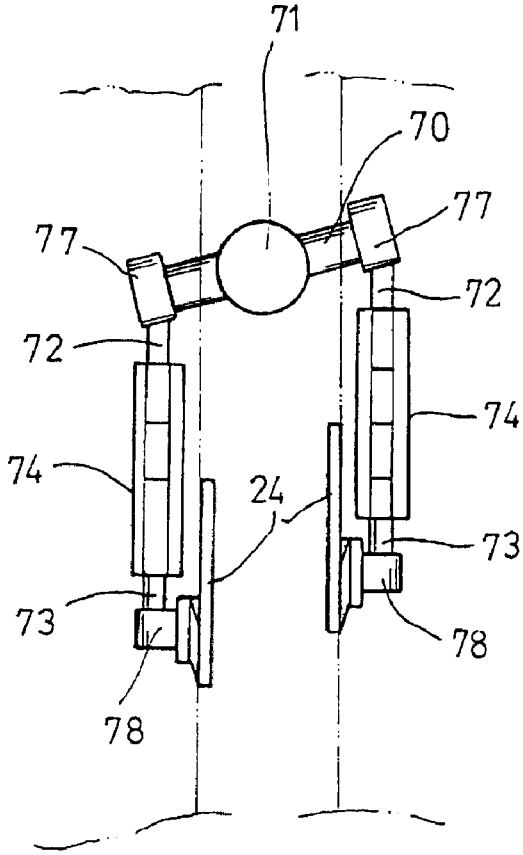
FIG. 16 is a partial top plane schematic view of the treadmill apparatus as shown in FIGS. 14 and 15.
Figure 15:
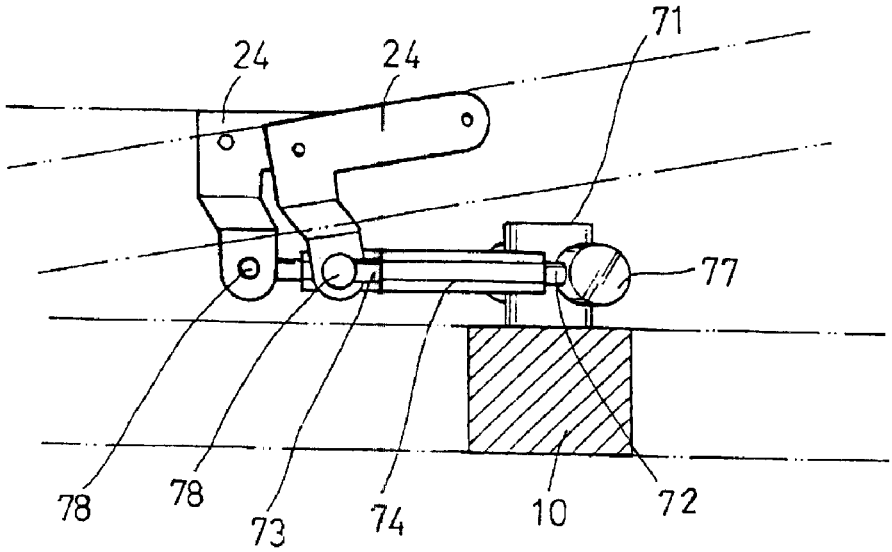
FIG. 15 is a partial side plane schematic view of the treadmill apparatus as shown in FIG. 14.

Referring next to FIGS. 14-16, illustrated is another embodiment of the coupling device which also, includes an arm 70 rotatably secured to the base 10 with a pivot axle 71. However, the ends of the arm 70 may be moved forward and rearward, instead of being moved up and down as that shown in FIGS. 2-10. Two pairs of bolts 72, 73 are pivotally secured to the ends of the arm 70 and to the bars 24 with a joint, such as a universal joint 24 respectively. A longitudinal nut 74 is threaded onto the pair of bolts 72, 73 for moving or adjusting the bolts 72, 73 toward or away from each other and for adjusting the bars 24 relative to the arm 70, according to the configuration or the location of the treadmills 20, 30.

Accordingly, the treadmill apparatus in accordance with the present invention includes dual treads for conducting both jogging and stepping exercises.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A treadmill apparatus comprising:

a base including a first end, and including a second end having a shaft provided thereon, a pair of treadmills disposed above said base, and each including a platform having a roller provided on a first end thereof and attached to said shaft, and each including a tread supported around said platform, means for driving said shaft to actuate said treads, an arm including a middle portion pivotally supported on said base with a pivot axle, and including two ends located below said treadmills respectively, and means for coupling said ends of said arm to said treadmills to elevate a first of said treadmills when a second of said treadmills is lowered, and to elevate said second treadmill when said first treadmill is lowered.

2. The treadmill apparatus according to claim 1, wherein said [treadmills each includes] *means for coupling includes, for each of said treadmills,* a bar attached to said platform thereof and extended downward from said platform for coupling to said ends of said arm respectively.

3. The treadmill apparatus according to claim 1, wherein said ends of said arm each includes a rod provided therein and perpendicular to said arm, a column pivotally secured on said rod respectively, said treadmills each includes a bar attached to said platform thereof and coupled to said column respectively.

4. The treadmill apparatus according to claim 1 further comprising means for locking said treadmills together.

5. The treadmill apparatus according to claim 1 further comprising means for retaining said treads on said platforms respectively.

*6. An exercise apparatus comprising:*

*a base;*

*a first treadmill assembly operatively coupled with the base and supported in pivotal relation with the base;*

*a second treadmill assembly operatively coupled with the base and supported in pivotal relation with the base;*

*a reciprocating coupling assembly interconnected between the first treadmill assembly and the second treadmill assembly, the reciprocating coupling assembly constraining the first treadmill assembly and the second treadmill assembly to move in opposite directions when reciprocating;*

*a shaft operatively supported by the base;*

*the first treadmill assembly pivotally supported at the shaft; and*

*the second treadmill assembly pivotally supported at the shaft.*

*7. The exercise apparatus of claim 6 wherein:*

*the first treadmill assembly further comprises a first roller supported on the shaft; and*

*the second treadmill assembly further comprises a second roller supported on the shaft.*

*8. The exercise apparatus of claim 7 further comprising:*

*a motor supported on the base, the motor adapted to drive the first roller and the second roller.*

*9. The exercise apparatus of claim 8 wherein the motor is coupled with the shaft.*

*10. An exercise apparatus comprising:*

*a base;*

*a first treadmill assembly in pivotal relation with the base;*

*a second treadmill assembly in pivotal relation with the base;*

*a coupling device pivotally coupled with the base, the coupling device further coupled with the first treadmill assembly and the second treadmill assembly;*

*a shaft operatively supported by the base;*

*the first treadmill assembly pivotally supported at the shaft; and*

*the second treadmill assembly pivotally supported at the shaft, whereby the coupling device is adapted to elevate the first treadmill assembly when the second treadmill assembly is depressed, and to elevate the second treadmill assembly when the first treadmill assembly is depressed.*

*11. The exercise apparatus of claim 10 wherein:*

*the first treadmill assembly further comprises a first roller supported on the shaft; and*

*the second treadmill assembly further comprises a second roller supported on the shaft.*

*12. The exercise apparatus of claim 11 further comprising:*

*a motor supported on the base, the motor adapted to drive the first roller and the second roller.*

*13. The exercise apparatus of claim 12 wherein the motor is coupled with the shaft.*

*14. The treadmill apparatus according to claim 1, wherein the base includes a horizontal frame member extending parallel to the shaft, the middle portion of the arm pivotally supported on the horizontal frame member of the base with the pivot axle.*

*15. The treadmill apparatus according to claim 14, wherein the pivot axle is mounted to a side of the horizontal frame member of the base.*

*16. The exercise apparatus according to claim 6, wherein the base includes a horizontal frame member extending parallel to the shaft, the reciprocating coupling assembly pivotally supported on the horizontal frame member of the base.*

*17. The exercise apparatus according to claim 16, wherein the reciprocating coupling assembly is pivotally supported with a pivot axle mounted to a side of the horizontal frame member of the base.*

*18. The exercise apparatus according to claim 10, wherein the base includes a horizontal frame member extending parallel to the shaft, the coupling device pivotally coupled to the horizontal frame member of the base.*

*19. The exercise apparatus according to claim 18, wherein the coupling device is pivotally coupled with a pivot axle mounted to a side of the horizontal frame member of the base.*

*20. The treadmill apparatus according to claim 2, wherein the means for coupling includes, for each of the treadmills, a universal joint disposed between and coupling the respective bar to the arm.*

*21. The treadmill apparatus according to claim 20, wherein the means for coupling includes, for each of the treadmills:*

*a member coupled to and extending perpendicularly from the respective bar; and*

*a pivot rod pivotally coupled to the arm,*

*wherein the universal joints couple the members to the respective pivot rods.*

*22. The treadmill apparatus according to claim 21, wherein the means for coupling includes, for each of the treadmills, a rod spanning opposite sides of a respective one of the two ends of the arm, the respective pivot rod pivotally coupled to the rod.*

*23. The treadmill apparatus according to claim 22, wherein the opposite sides of the arm are parallel and the rods are perpendicular to the sides.*

*24. The treadmill apparatus according to claim 22, wherein one of the sides of the arm includes the middle portion pivotally supported on the base.*

*25. The treadmill apparatus according to claim 3, wherein the respective bar of each treadmill is coupled to the respective column by a universal joint.*

*26. The treadmill apparatus according to claim 3, wherein the ends of the arm each includes opposite sides with the respective rod coupled therebetween.*

*27. The treadmill apparatus according to claim 4, wherein each of the platforms of the treadmills includes an engagement member, and the means for locking includes a locking member pivotally coupled to the base to move into and out of engagement with the engagement members.*

*28. The treadmill apparatus according to claim 27, wherein the engagement members extend downwardly from the respective platforms below the respective treads.*

*29. The treadmill apparatus according to claim 27, wherein the engagement members are disposed on inner sides of the respective platforms.*

*30. The treadmill apparatus according to claim 27, wherein the base includes a horizontal frame member extending parallel to the shaft, the locking member pivotally supported on the horizontal frame member of the base.*

*31. The exercise apparatus according to claim 30, wherein the locking member is pivotally coupled to a top of the horizontal frame member of the base.*

*32. The treadmill apparatus according to claim 5, wherein the means for retaining includes, for each of the treadmills, at least one stop connected to the respective platform and extending downwardly so as to be configured to engage a portion of the respective tread beneath the respective platform.*

*33. The exercise apparatus according to claim 32, wherein the stops are connected to outer sides of the respective platforms.*

*34. The exercise apparatus according to claim 32, wherein the at least one stop connected to the respective platform comprises a plurality of stops disposed longitudinally along the respective platform.*

* * * * *